United States Patent [19]

Iijima et al.

[11] 4,239,835
[45] Dec. 16, 1980

[54] MAGNETIC RECORDING MEDIUM

[75] Inventors: Yasuo Iijima; Koichi Shinohara, both of Kobe; Takashi Fujita; Masaru Odagiri, both of Kawanishi; Toshiaki Kunieda, Takarazuka, all of Japan

[73] Assignee: Matsushita Electric Industrial Co., Ltd., Osaka, Japan

[21] Appl. No.: 815,301

[22] Filed: Jul. 13, 1977

[30] Foreign Application Priority Data

| Jul. 15, 1976 | [JP] | Japan | 51/84829 |
| Sep. 24, 1976 | [JP] | Japan | 51/115271 |
| Sep. 28, 1976 | [JP] | Japan | 51/116932 |
| Nov. 5, 1976 | [JP] | Japan | 51/133378 |

[51] Int. Cl.$^3$ .................... H01F 1/06; H01F 1/33
[52] U.S. Cl. ..................... 428/611; 428/626; 428/632; 428/652; 428/653; 428/678; 428/680; 428/62; 428/457; 428/900; 428/928; 427/132
[58] Field of Search ............ 428/611, 626, 632, 667, 428/457, 467, 900, 928, 472, 265, 652, 653, 628, 680; 360/134, 135, 136, 131; 427/132, 47, 48; 148/31.55

[56] References Cited

U.S. PATENT DOCUMENTS

| 2,970,075 | 1/1961 | Grenoble | 148/31.55 |
| 3,433,721 | 3/1969 | Wolf | 428/611 |
| 3,471,271 | 10/1969 | Brown et al. | 428/667 |
| 3,520,664 | 7/1970 | York | 427/132 |
| 3,702,239 | 11/1972 | Nogy et al. | 428/626 |
| 3,857,734 | 12/1974 | Chem et al. | 428/469 |
| 3,996,095 | 12/1976 | Ahm et al. | 428/469 |
| 4,005,698 | 2/1977 | Cuomo et al. | 126/470 |
| 4,024,489 | 5/1977 | Bajoreh et al. | 428/667 |
| 4,074,016 | 2/1978 | Trippel | 428/632 |
| 4,088,547 | 5/1978 | Albertson | 204/32 R |

FOREIGN PATENT DOCUMENTS 47-508  1/1972  Japan .................... 148/31.55

OTHER PUBLICATIONS

Hackh's Chemical Dictionary 4th Edition, McGraw Hill pg. 453 (1969).
Albertson, C. *Machine Design*, pg. 24, "New Solar Energy Absorber Hold Its Heat" Apr. 3, 1975.

*Primary Examiner*—L. Dewayne Rutledge
*Assistant Examiner*—Michael L. Lewis
*Attorney, Agent, or Firm*—Burgess, Ryan and Wayne

[57] ABSTRACT

A magnetic recording medium wherein a ferromagnetic substance consisting of Fe, Co, Ni or alloy thereof is vacuum evaporated and deposited on a substrate made of a plastic film or a sheet of non-magnetic metal. The thin ferromagnetic film has the columnar crystal structure, and the columnar crystals are coated with a layer of oxide of the ferromagnetic substance.

9 Claims, 7 Drawing Figures

MAGNETIC RECORDING MEDIUM

BACKGROUND OF THE INVENTION:

The present invention relates generally to an improved a magnetic recording medium of a thin ferromagnetic film formed by vacuum deposition and a method for manufacture thereof.

In the conventional process for manufacture of so-called coated type magnetic tapes, magnetic powder such as gamma-$Fe_2O_3$ or $CrO_2$ is mixed with a binder, and the mixture is applied over a substrate and cured. In this process, the binder cannot be eliminated because it is used to disperse the magnetic powder. As a result, the information recording density of the coated type magnetic tapes cannot be improved beyond a certain limit. In order to solve this problem, there has been invented and demonstrated a thin ferromagnetic type magnetic tape which may be manufactured without the use of a binder. The thin metal or ferromagnetic film may be prepared by several methods such as chemical plating, vacuum deposition, sputtering, ion plating and so on. Of these methods, vacuum deposition is most advantageous in that the evaporation rate is fast and this method is very simple. However, the thin ferromagnetic film type tape has the problem of satisfactorily increasing its coercive force. For instance, with the chemical plating method, studies and experiments of increasing the coercive force of a thin cobalt film by adding a suitable impurity such as phosphorus have been long conducted. With the ion plating method, a thin film is formed under a high pressure of the order of $10^{-2}$ to $10^{-3}$ torr so as to control the grain size, thereby improving the coercive force. The thin magnetic film type tape prepared by the chemical plating method is however not satisfactory in practice because the strength of joint between the thin metal film and the substrate is not sufficient and the film forming rate is too slow. The thin magnetic film prepared by the ion plating method is also not satisfactory because its thin film forming rate is too slow.

The film forming rate of the vacuum deposition method is faster than any other method, but the coercive force of thin metal film tapes fabricated by the vacuum deposition method is in general less than 100 Oe which is considerably less than 200 to 500 Oe of the conventional coated type magnetic tapes so that they are unsatisfactory in practice. The volume or bulk coercive force of Fe, Co or Ni is tens Oe at the highest. The coercive force of a thin film formed by the vacuum deposition of these metals is 100 Oe at the highest, because the ferromagnetic metal is evaporated in a nearly ideal vacuum ($10^{-4}$ to $10^{-6}$ torr) in the form of atoms and is recrystalized on a substrate.

A method is known in which the beam of evaporating metal is made incident at an angle greater than 45° on a substrate in order to increase the coercive force of a thin magnetic film. However, the evaporation or thin film forming rate is too low to be used in practice.

SUMMARY OF THE INVENTION

One of the objects of the present invention is to provide a magnetic recording medium having a high coercive force and capable of high density recording.

Another object of the present invention is to provide an extremely thin magnetic recording medium whose output variation is minimum.

To the above and other ends, the present invention provides a thin metal film type magnetic recording medium wherein a thin ferromagnetic film continuously formed by vacuum deposition on a substrate of a plastic film or a sheet of nonmagnetic metal has a columnar crystal structure, and the columnar crystals are coated with a layer of oxide of a ferromagnetic substance. The present invention also provides a method for manufacture of the magnetic recording media of the type described.

DESCRIPTION OF THE PREFERRED EMBODIMENTS

Prior to the description of the preferred embodiments of the present invention, the underlying principle thereof will be described. The inventors made extensive studies and experiments on the crystal structures of thin ferromagnetic films prepared by vacuum deposition or evaporation, and found that in practice satisfactory coercive force depends upon somewhat limited crystal structures and the chemical oxidation states of the crystal grain boundaries. A method is known wherein a thin magnetic film of cobalt formed on an aluminum substrate is coated with an oxide layer. The oxide film is formed by burning. A lubricating layer is further formed on the oxide film. In general, the thin metal films prepared by the vacuum deposition process exhibit various crysal structures depending upon materials used. When the evaporation rate is higher (in excess of 1,000 Å/min), amorphous and uniform films tend to be formed.

The investigation of Fe, Ni, Co and alloys thereof which are ferromagnetic showed that the same results are obtained, as with other materials. The coercive force of thin films of these metals is in the order of 100 Oe at the highest, and there is a tendency that the thicker the thin film, the lower the coercive force becomes.

The inventors used a wide variety of substrates and vacuum evaporation and deposition conditions which had never been employed before to prepare the thin ferromagnetic films with various crystal structures and found that the thin magnetic films thus prepared have a coercive force of 200 to 1,000 Oe which is equal to or higher than the coercive force of conventional magnetic tapes.

Figure 1A:
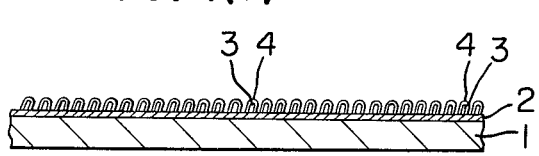
FIGS. 1A and 1B are fragmentary sectional views, on enlarged scale, of a magnetic recording medium in accordance with the present invention and it can be seen that the columnar crystals are of substantially the same height.
Figure 1B:
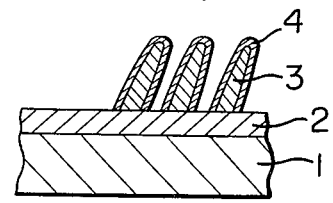

Referring to FIG. 1, a substrate 1 is made of a plastic film of polyethylene terephthalate, polycarbonate, polypropylene or the like. If required, the substrate is coated with a layer 2 for facilitating uniform deposition and strong adhesion of a ferromagnetic film. Most desirable effects can be attained when the layer 2 is made of a metal such as Al, Ti, Mo, Si and the like as will be described in detail hereinafter. The thin ferromagnetic film 3 has columnar crystals coated with an oxide 4. The ferromagnetic materials used in deposition of thin films are Fe, Co, Ni, alloys thereof and alloys of Fe, Co and Ni with suitable nonmagnetic materials.

Next the vacuum evaporation process for growing such special or columnar crystals 3 will be described. In general, according to the vacuum evaporation process, a evaporation metal is heated in an atmosphere at $10^{-4}$ to $10^{-6}$ torr and an evaporant is deposited on a substrate to recrystallize. Gases in a vacuum evaporation apparatus contain water, those gases contained in the air and those liberated from the substrate 1. It is difficult to operate the vacuum evaporation process under the same and stable conditions. One solution to this problem is to introduce a limited volume of gases so as to improve the reproducibility of both composition and volume of gases in the apparatus.

The composition and volume of gases in the apparatus effect the crystal growth of a thin metal film. The inventors found out that when oxygen gas is introduced into the vacuum evaporation apparatus, the quality uniformity as well as reproducibility may be considerably improved. For instance, when Fe is vacuum deposited at an evaporation rate of 3,000 Å/min, at an oxygen partial pressure of $1 \times 10^{-4}$ torr, upon a substrate of polyethylene terephthalate, a magnetic tape having the coercive force ranging from 300 to 600 Oe can be obtained.

Factors affecting the growth of such columnar crystals are the evaporation rate, physical properties of a substrate and the atmosphere. Furthermore the method for inclining a substrate to the incident beam of evaporating metal or the method for effecting the vacuum deposition in magnetic or electrical fields will also influence the growth of columnar crystals. It is preferable to use an electron microscope, although not limited, to observe the crystal structures of thin magnetic films. The ratio of height to width of a columnar crystal grown by the process in accordance with the present invention is in general higher than three, and the columnar crystal is inclined at an angle relative to the major surface of a substrate or undercoating. Thus it can be seen that for a ratio of three the thin film of ferromagnetic material is from about 300 Å to 3000 Å thick. The inventors found that the columnar crystals incline in general at angles less than 60° relative to the vertical, and they are similar in size to the thickness of a film. Furthermore the inventors found that columnar crystals having a width (cross sectional) of less than 500 Å exhibit very satisfactory results. The inventors found that the combination especially with the process for inclining the substrate relative to the incidence beam can attain very satisfactory results.

Preferably the thickness of the oxide coating 4 of the columnar ferromagnetic crystal 3 is more than 20 Å. The thicker oxide coating 4 will not adversely affect the coercive force, but is not preferable in the case of a ferromagnetic material which is de-magnetized by oxidation because the remanent magnetization decreases.

For ordinary or general purpose magnetic tapes, the cross section of the column of the columnar crystals 3 is preferably between 100 Å and 1,000 Å, though not limited.

It has not been explained why a thin ferromagnetic film consisting of columnar crystals 3 coated with the oxide film 4 has high coercive force and excellent properties required for magnetic tapes. A possible explanation is that opposed to the conventional vacuum deposition processes wherein crystals are grown in an air atmosphere or an atmosphere substantially similar to air, the crystal growth is effected in a highly pure atmosphere so that the uniform grain size results. Furthermore oxygen gas may serve to produce finely divided crystal grains of uniform size. This is assumed by the fact that the coercive force is highly stable at various pressures and temperatures and that anisotrophy is produced by form anisotropy of controlled grain size.

The control of grain size alone can be attained by ion plating under a controlled gas pressure, but the columnar crystals cannot be grown. The inventors assume that the columnar crystals grown by the vacuum deposition process have properties substantially similar to those of needle crystals of gamma—$Fe_2O_3$ grown by the coating process. Even when the columnar crystals 3 are partly coated with the oxide film 4, the same effects may be attained.

The thin magnetic films prepared by a magnetic substance mainly consisting of Fe, Co, Ni and alloys thereof have the problems of low output, higher loss in a high frequency range and higher noise, but these problems may be substantially solved by the present invention so that thin magnetic films having excellent recording properties may be provided. The inventors found that of thin magnetic films prepared by vacuum evaporation and deposition of Fe, Co, Ni and alloys thereof, a thin magnetic film having a volume resistivity in excess of 1.2 times as high as that of the composition metal exhibits considerably improved output, negligible loss at a high frequency range and very small noise.

Figure 2:
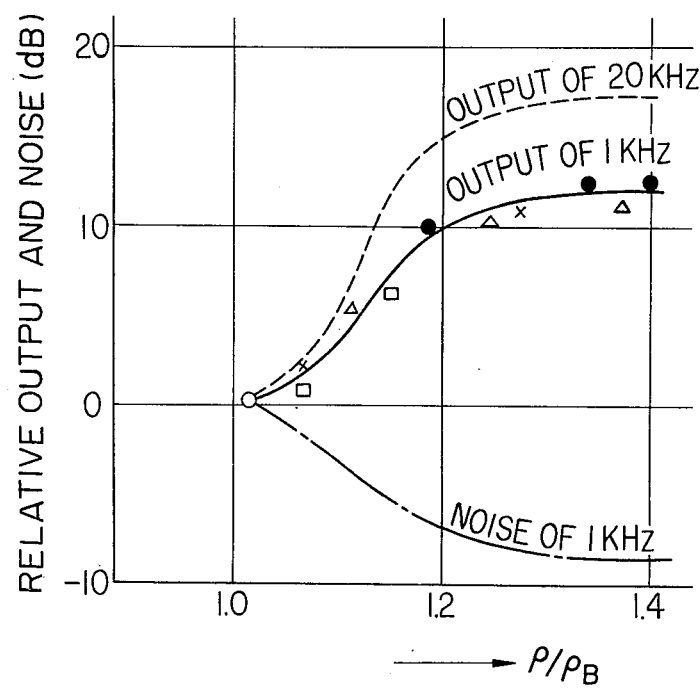
FIG. 2 is a graph showing the relationship between the volume resistivity of a thin magnetic film formed by vacuum deposition on the one hand and the output and noise on the other hand.

FIG. 2 shows the relationship between the volume resistivity and relative output and noise of a thin magnetic film prepared by vacuum evaporation of Co of 3,000 Å in thickness on a polyester film. The ratio $(\rho/\rho_B)$ of a volume resistivity $\rho$ to that $\rho_B$ of bulk of Co is plotted along the abscissa while the output relative to a reference input and noise are plotted along the ordinate, the output and noise levels being 0 dB when $\rho/\rho_B$ is 1.0. Recording biase frequency of 200 KHz was used in the measurement of output. The solid curve indicates the output of 1 KHz; the broken line curve, the output of 20 KHz; and the one-dot chain curve, the noise of 1 KHz. The open circle symbol O indicates a thin magnetic film prepared by the simple vacuum deposition; the triangle symbol Δ, a thin magnetic film prepared by inclining a substrate to the incident beam of evaporating metal; the cross symbol X, a thin magnetic film prepared by vacuum evaporation in an atmosphere containing oxygen; the closed circle symbol o, a thin magnetic film heat treated at 100° C. after vacuum deposition; and the square symbol ▫, a thin magnetic film heat treated at 70° C. after vacuum evaporation.

It is seen that the resistivity of a thin magnetic film may be increased by the vacuum evaporation process wherein a substrate is inclined to the incident beam of evaporating metal, the introduction of oxygen gas or by the after-heat-treatment. Furthermore, the higher the ratio $\rho/\rho_B$, the higher the output becomes, and when the ratio $\rho/\rho_B$ is in excess of 1.2, the output of 1 KHz increases by about 10 dB while the output of 20 KHz increases by about 15 dB. On the other hand, noise of 1 KHz decreases by about 7 dB. Thus the characteristics and properties of thin magnetic films can be considerably improved by the increase in resistivity. The difference between the methods for increasing the resistivity will not result in any appreciable difference in characteristics and properties.

In summary, the present invention provides magnetic films prepared by vacuum evaporation of a magnetic substance mainly consisting of Fe, Co, Ni and alloys thereof. The thin magnetic films have a volume resistivity in excess of 1.2 times as high as that of bulk of the composition metal or alloy. The output may be considerably improved, especially in a high frequency range, and noise is remarkably reduced so that the magnetic tapes having excellent characteristics and properties hitherto unattainable by the conventional magnetic tapes may be provided.

Figure 3:
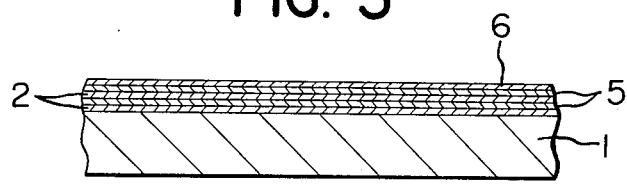
FIG. 3 is a sectional view, on enlarged scale, of a thin magnetic film type tape in accordance with the present invention, used for the explanation of an undercoating thereof.

Next referring to FIG. 3, the undercoating 2 will be described in detail. A magnetic tape shown in FIG. 3 consists of a polyethylene terephthalate film, an undercoating 2 made of aluminum, a thin magnetic film 5 in accordance with the present invention and an overcoating 6 made of a metal or organic compound for improving the transportability of the tape.

A magnetic tape with the above construction was compared with a conventional magnetic tape provided with no aluminum undercoating 2, in terms of the varation in output voltage in the longitudinal direction. The variation of the conventional tape was 10 to 20%/m, while the variation of the magnetic tape in accordance with the present invention was less than 7.5%/m. The latter was prepared by the vacuum deposition of a cobalt alloy on a polyester film.

The magnetic substances are Fe and Ni, exept the above cobalt Co and alloys of Fe, Ni, Co. When the thickness of the aluminum undercoating 2 is thicker than 100 Å, the desired effects may be obtained. The thickness of the magnetic tape is preferably less than one micron.

In addition to aluminum, Ti, Cr, Mo, Ta and so on may be used, but in view of the characteristic forming a film and cost, aluminum is most preferable. The same effects may be attained by an aluminum oxide undercoating.

Figure 4:
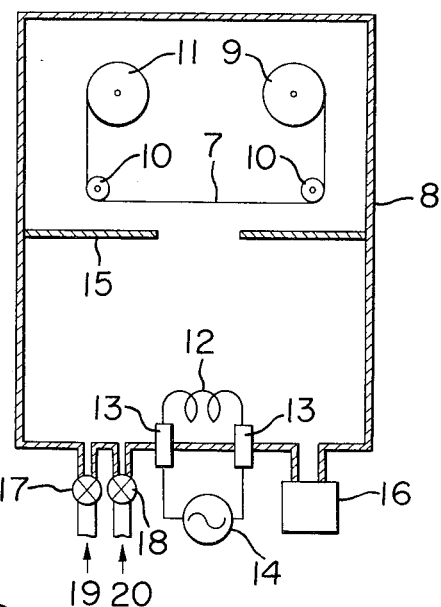
FIG. 4 is a schematic view of an apparatus used for the fabrication of magnetic recording medium in accordance with the present invention.

Next referring to FIGS. 4, 5 and 6, the process for manufacture of magnetic tapes in accordance with the present invention will be described. First referring to FIG. 4, within a vacuum chamber 8, the substrate 7 wound on a roll 9 is unwound and taken up by a takeup reel 11. The substrate 7 being made of a high molecular weight compound or non-magnetic material and being guided by guide rollers 10. An evaporation source 12 is connected to a power source 14 through insulated terminals 13 so that upon energization of the evaporation source 12, a metal or alloy (not shown) is heated and evaporated. The vacuum chamber 8 is provided with a partition wall 15 having an aperture, and the evaporant is deposited upon the substrate 7 in the vicinity of the aperture. The vacuum chamber 8 is evacuated by a vacuum pump such as an ion pump, and gases 19 and 20 which are introduced into the vacuum chamber 8 are controlled by variable leak valves 17 and 18, respectively.

In this embodiment, the substrate 7 is transported in opposed relationship with the evaporation source 12, but the substrate 7 may be suitably inclined to the incident beam of evaporating metal in order to produce a desired anisotropy. The angle of inclination may be determined depending upon a selected ferromagnetic substance. The evaporation source 12 may be any of the conventional evaporation sources such as an electron beam evaporator, a high frequency induction heating device and the line.

One of the essential features of the present invention resides in the fact that the oxygen gas is introduced into the vacuum chamber 8. In addition to oxygen gas, inert gases and other reactive gases may be introduced, but it is essential that the partial pressure of oxygen in the vacuum deposition atmosphere must be higher than the partial pressures of other gases. In other words, the oxygen gas in the atmosphere must have the highest partial pressure. The purification of gases to be introduced into the vacuum chamber 8 is effected in any suitable conventional manner, and a suitable arrangement for introducing gases into the vacuum chamber in a stable manner is of course provided.

In operation, a liquefied nitrogen trap is used to evacuate the vacuum chamber 8, and then the ion pump 16 is driven to evacuate the chamber 8 to $3 \times 10^{-6}$ torr. Thereafter oxygen with a purity higher than 99.99% is introduced into the chamber 8 until the pressure within the chamber 8 rises to $10^{-6}$ to $10^{-3}$ torr, and then cobalt is heated and evaporated by the high frequency induction heating device to deposite cobalt 2,500 to 3,000 Å in thickness on a substrate made of polyimide 100 microns in thickness.

Figure 5:
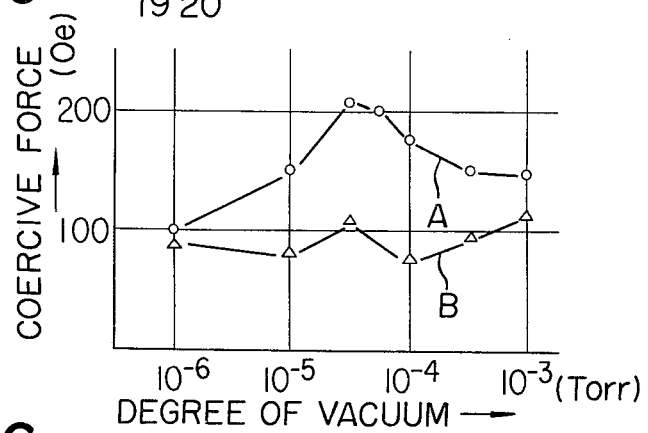
FIGS. 5 and 6 are graphs both used for the explanation of magnetic coercive force and secular variation of the magnetic recording media in accordance with the present invention in comparison with the conventional magnetic tapes.

FIG. 5 shows the relationship between the vacuum pressure and the coercive force of thus obtained magnetic tape (curve A), and for the sake of comparison shown is the coercive (curve B) of a conventional type magnetic tape prepared by keeping the degree of vacuum in the vacuum chamber between $10^{-6}$ and $10^{-3}$ torr by opening and closing a valve (not shown) interconnecting between the vacuum chamber and the vacuum pump or exhaust system.

From FIG. 5 it is readily seen that the presence of oxygen gas in the vacuum deposition atmosphere contributes to the considerable increase in coercive force. This effect may be equally obtained when Fe, Ni, Co and alloys thereof are used.

It is preferable that oxygen gas is introduced into the vacuum chamber until the degree of vacuum thereof drops to $10^{-3}$ to $10^{-5}$ torr, but the degree of vacuum may be controlled so as to be $10^{-6}$ to $10^{-7}$ torr when the initial degree of vacuum is increased.

Figure 6:
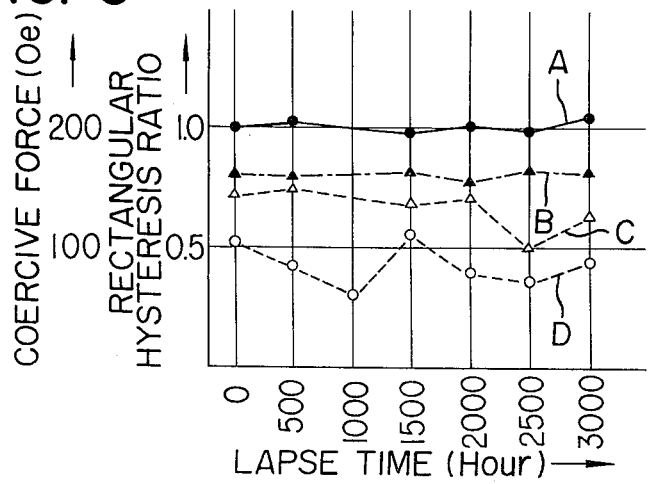

In FIG. 6 there are shown the characteristic curves A and B of secular variation of magnetic tapes fabricated in accordance with the present invention and those C and D of conventional magnetic tapes, these test tapes being left at 45° C. and at humidity of 80% and their coercive force as well as rectangular hysteresis ratios being measured. It is apparent that the magnetic tapes in accordance with the present invention exhibit by far excellent magnetic characteristics than the conventional ones in coercive force and triangular ratio.

In summary, according to the present invention oxygen gas is introduced into the vacuum chamber wherein vacuum deposition such as electron beam deposition, ion plating and so is effected, so that the magnetic tapes having stable and improved magnetic characteristics such as coercive force, rectangular hysteresis ratio and so on may be provided. In addition, the present invention may be applied to the manufacture of laminations consisting of alternate magnetic and non-magnetic layers and of magnetic tapes with a substrate consisting of a film made of a high molecular compound and coated with a non-magnetic metal layer. In addition to oxygen, argon or nitrogen whose partial pressure is lower than the partial pressure of oxygen may be introduced in a quantity of 1/10 to 1/5 by volume of oxygen, but the use of the atmosphere consisting of 100% of oxygen can attain the most desirable effects.

What is claimed is:

1. A thin metal film type magnetic recording medium which comprises a plastic film or non-magnetic metal substrate, a thin film less than about 3000 Å thick of a ferromagnetic metal or alloy having a columnar crystal structure inclined at an angle of less than 60° relative to the normal to said substrate wherein the columnar crystals are substantially the same height, having been continuously formed by vacuum deposition, and a layer of an oxide of a ferromagnetic metal or alloy coated on said columnar crystals.

2. A thin metal film type magnetic recording medium as set forth in claim 1 wherein said thin ferromagnetic film is made of iron, cobalt, nickel or alloy thereof, and has a volume resistivity in excess of 1.2 times as high as the volume resistivity of the composition metal or alloy.

3. A thin metal film type magnetic recording medium as set forth in claim 1 wherein said substrate is coated with a layer of aluminum or aluminum oxide, and said thin ferromagnetic film is deposited upon said layer of aluminum or aluminum oxide.

4. A thin metal film type magnetic recording medium as set forth in claim 2 wherein said substrate is coated with a layer of aluminum or aluminum oxide, and said thin ferromagnetic film is deposited on said layer of aluminum or aluminum oxide.

5. The magnetic recording medium of claim 1 wherein the ratio of the height to width of said columnar crystal structure is at least 3:1.

6. The magnetic recording medium of claim 1 wherein the ferromagnetic metal is selected from the group consisting of Fe and Co.

7. The magnetic recording medium of claim 1 wherein the thin film of ferromagnetic material is from about 300 Å to 3000 Å thick.

8. A thin metal film type magnetic recording medium which comprises a plastic film or non-magnetic metal substrate, a thin film less than about 3000 Å thick of a ferromagnetic metal or alloy having a crystal structure in the form of discrete columnar structures inclined at an angle less than 60° relative to the normal to said substrate wherein the columnar crystals are substantially the same height and a layer of an oxide of a ferromagnetic metal or alloy on said discrete columnar structure.

9. The magnetic recording medium of claim 8 wherein the ferromagnetic metal is selected from the group consisting of Fe and Co.

* * * * *

UNITED STATES PATENT AND TRADEMARK OFFICE
CERTIFICATE OF CORRECTION

PATENT NO. : 4,239,835
DATED : Dec. 16, 1980
INVENTOR(S) : Yasuo Iijima, et al

It is certified that error appears in the above—identified patent and that said Letters Patent is hereby corrected as shown below:

Column 5, line 30: "vara" should be --varia--.

line 37: "exept" should be --except--.

Signed and Sealed this

Fourteenth Day of July 1981

[SEAL]

Attest:

Attesting Officer

GERALD J. MOSSINGHOFF
Commissioner of Patents and Trademarks